US009168455B2

(12) United States Patent
Weisman

(10) Patent No.: US 9,168,455 B2
(45) Date of Patent: Oct. 27, 2015

(54) GAME SYSTEM WITH MARKED PLAY-PIECES

(71) Applicant: Harebrained Holdings Inc., Bellevue, WA (US)

(72) Inventor: Jordan Weisman, Bellevue, WA (US)

(73) Assignee: HAREBRAINED HOLDINGS INC., Bellevue, WA (US)

( * ) Notice: Subject to any disclaimer, the term of this patent is extended or adjusted under 35 U.S.C. 154(b) by 167 days.

(21) Appl. No.: 13/889,679

(22) Filed: May 8, 2013

(65) Prior Publication Data

US 2014/0335958 A1    Nov. 13, 2014

(51) Int. Cl.
  *A63F 13/10*    (2006.01)
  *A63F 13/00*    (2014.01)
(52) U.S. Cl.
  CPC ....................................... *A63F 13/00* (2013.01)
(58) Field of Classification Search
  USPC ...................................................... 463/30, 37
  See application file for complete search history.

(56) References Cited

U.S. PATENT DOCUMENTS

| 6,899,332 B2 | 5/2005 | Weisman | |
| 2006/0040720 A1 | 2/2006 | Harrison | |
| 2012/0105653 A1 | 5/2012 | Yoshida | |
| 2013/0217491 A1* | 8/2013 | Hilbert et al. | 463/31 |
| 2014/0094298 A1* | 4/2014 | Lyons et al. | 463/31 |
| 2014/0274344 A1* | 9/2014 | Kelly et al. | 463/25 |

OTHER PUBLICATIONS

The Lego Group, Billund, Denmark. "Lego Treasure Quest Electronic Scavenger Hunt Game," circa 1998.
Sony Computer Entertainment, Foster City, California, publisher. "The Eye of Judgment," circa 2007.
Flyball Manager's Playbook published 2005, printed from liveonthefly.com.

* cited by examiner

*Primary Examiner* — Pierre E Elisca
(74) *Attorney, Agent, or Firm* — Davis Wright Tremaine LLP; George C. Rondeau, Jr.

(57) ABSTRACT

A game system uses play-pieces, such as figurines, cards, and maps, each having multiple, machine-readable indicia. A hand-held reader for the indicia communicates with a computer, such as a tablet or smart phone. Players select which indicia to read with the reader, thereby identifying specific figurines, locations, commands, and the like by direct reference to the play-pieces themselves. Certain parameters associated with specific play-pieces are stored in a database of the computer, and may change over time, whether from progress in the game, or from updates made available online.

29 Claims, 14 Drawing Sheets

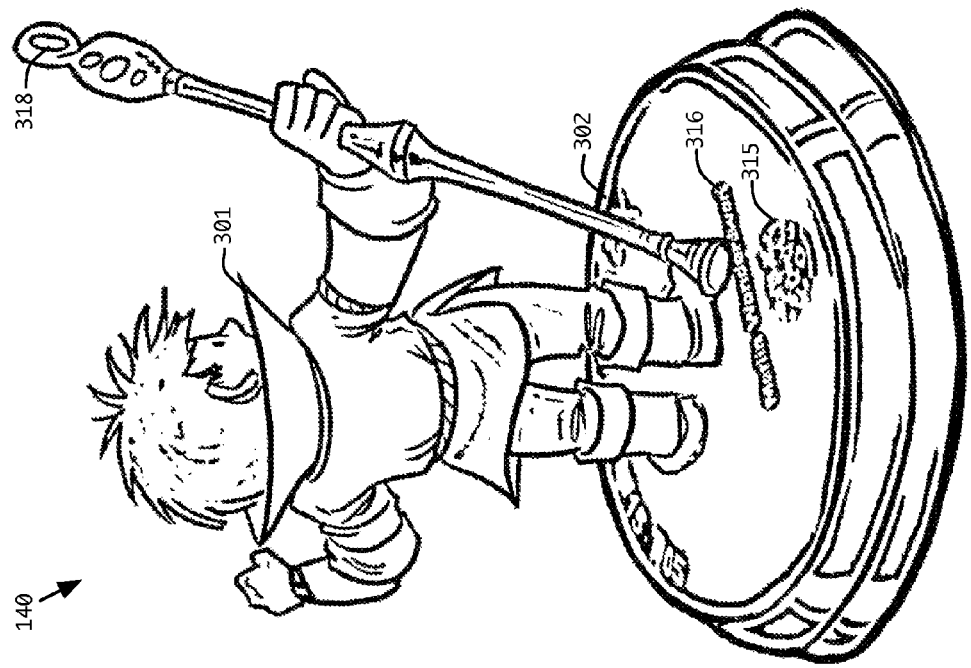
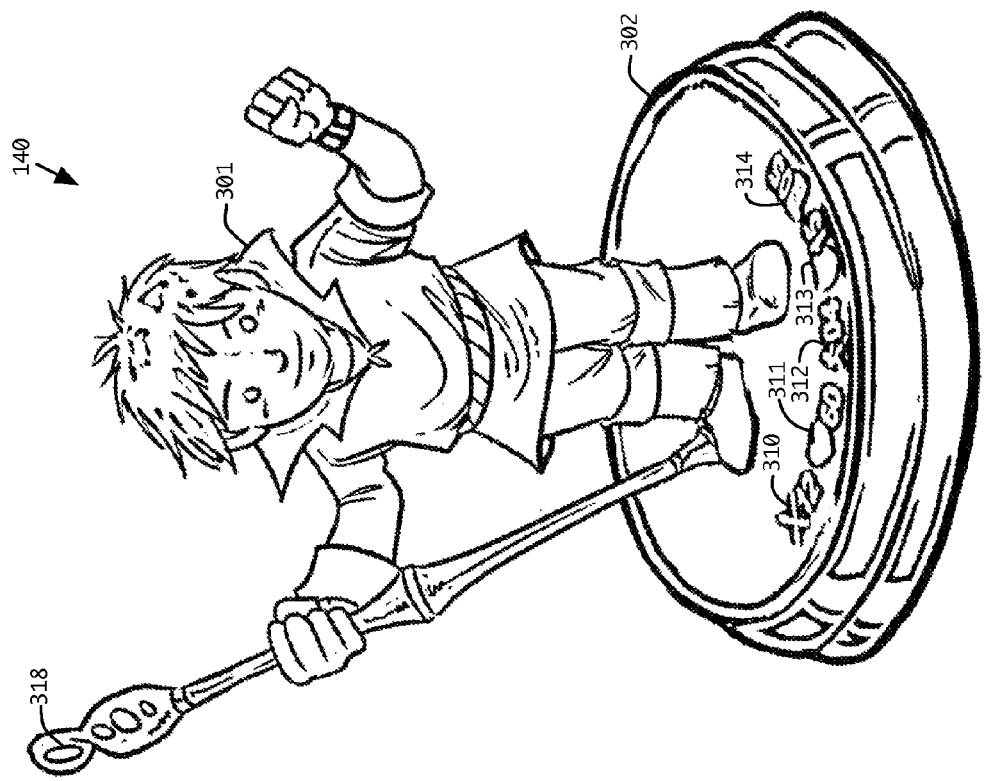
FIGURE 3a
FIGURE 3b

GAME SYSTEM WITH MARKED PLAY-PIECES

FIELD OF THE INVENTION

The present invention relates generally to a system for playing a tabletop game with the aid of a computer, and more particularly to a system in which the tabletop play-pieces are machine-readably marked.

CROSS REFERENCE TO RELATED APPLICATIONS

Not Applicable.

STATEMENT REGARDING FEDERALLY SPONSORED RESEARCH OR DEVELOPMENT

Not Applicable

REFERENCE TO COMPUTER PROGRAM LISTING APPENDICES

Not Applicable

BACKGROUND OF THE INVENTION

Various games have used play-pieces with machine-readable indicia to allow computer management of the game play. One such example is "Lego Treasure Quest Electronic Scavenger Hunt Game", published by The LEGO Group, Billund, Denmark, circa 1998. In Treasure Quest, competing players sought indicia-bearing keys hidden by another person (e.g., Mom), which, when found, were combined with a player's unique key-frame and inserted into a treasure chest containing a computer to judge and give the results (credit for the find). The computer would then dispatch the successful hunter to the next room. Another example is "The Eye of Judgment" published by Sony Computer Entertainment of Foster City, Calif., circa 2007, in which players would have a hand of cards, which when played onto the tableau, in view of a camera connected to a video game console, would be recognized by the video game console, which would display not only the tableau and the card, but having recognized the card and determined its orientation, would overlay computer graphic animations into the display, as if a monster had risen out of the card. When another card (from the opposing player) was laid onto the tableau near the first, and its indicia recognized, a second monster would appear and the two monsters would fight, eventually resulting in once card being removed from the game.

In each of these prior art instances, each play-piece has a single indicium. In the case of Treasure Quest, two play-pieces (the key and the player's key-frame) are combined. In both cases, the play-piece indicia (whether alone or in combination) allow the player to perform single function, offering no ability to select from functions. As a result, game play is very specific; with variation only coming from the combinations of which play-pieces are presented in which arrangement.

In HeroClix™, a miniatures war-game manufactured by WizKids/NECA, LLC. of New Jersey and taught by Weisman in U.S. Pat. No. 6,899,332, the game rules make use of a plurality of human-readable game play values provided on the base of character figurine play-pieces: Static indicia on the base of a HeroClix™ play-piece, as taught by Weisman, includes the character's: a) name, b) point value, c) rank, d) front arc, e) rear arc, f) collector's number, g) faction symbol, and h) combat values, while dynamic indicia are provided on dials in the base that are viewed through a slot and represent current values for the character's speed, attack, defense, and damage. As the game is played, Weisman's dynamic game play values change in response to outcomes that require the dial of the play-piece to be advanced. In some cases, a dynamic indicium may further indicate that a character's special ability is available. A drawback of the HeroClix system is that the indicia on a particular figure exclusively represent attributes of the character, whether static or dynamic, or metadata about other indicia (i.e., where a static icon provides the identify of an adjacent indicium, whether static or dynamic). Further, individual indicia do not represent, among other things, commands a player might issue in a game to a character, nor do indicia represent compound information (i.e., both a play-piece identifier and some other information). As a result, game progress requires frequent handling of a play-piece for human-examination of the values, or for manually advancement a dial to update the dynamic values, either of which, besides being inconvenient, can cause an issue if the play-piece is not exactly restored to its previous position.

OBJECTS AND SUMMARY OF THE INVENTION

The present invention relates generally to a system for playing a table-top game with the aid of a computer, and more particularly to a system in which the table-top play-pieces are machine-readably marked.

In the context of the present invention, a "play-piece" can be, by way of example and not limitation, a figurine, a printed cardboard figure, a cardboard disk, a playing card, a game board, or a map.

It is a goal of the present invention to provide hand-holdable, movable play-pieces for a game (as distinguished from virtual play-pieces as might exist within a computer game), in which the play-pieces are the controls with which actions (including movement) are taken within the game.

It is a goal of the present invention to provide a game system that can operate in conjunction with a smartphone or other personal computer having access to a database corresponding to the play-pieces.

It is a further goal for the game to be played by one person, or together with other individuals, whether co-located or mutually remote.

It is a goal for the game to be updateable to support new play-pieces by communication with a remote database, and another goal for the game to provide status and results reporting to the remote database to allow analysis of the game design and emergent dynamics of play to help improve the game design in subsequent releases or iterations.

BRIEF DESCRIPTION OF THE DRAWINGS

The aspects of the present invention will be apparent upon consideration of the following detailed description taken in conjunction with the accompanying drawings, in which like referenced characters refer to like parts throughout, and in which:

FIGS. 3A and 3B are the front and back of an example figurine play-piece of the present invention;

FIG. 9 shows the player selecting to perform magic;

FIG. 10 shows further selection from among multiple applicable spells;

FIG. 11 shows the player selecting a target for that magic;

FIG. 12 shows the results of the spell attack;

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE INVENTION

Figure 1:
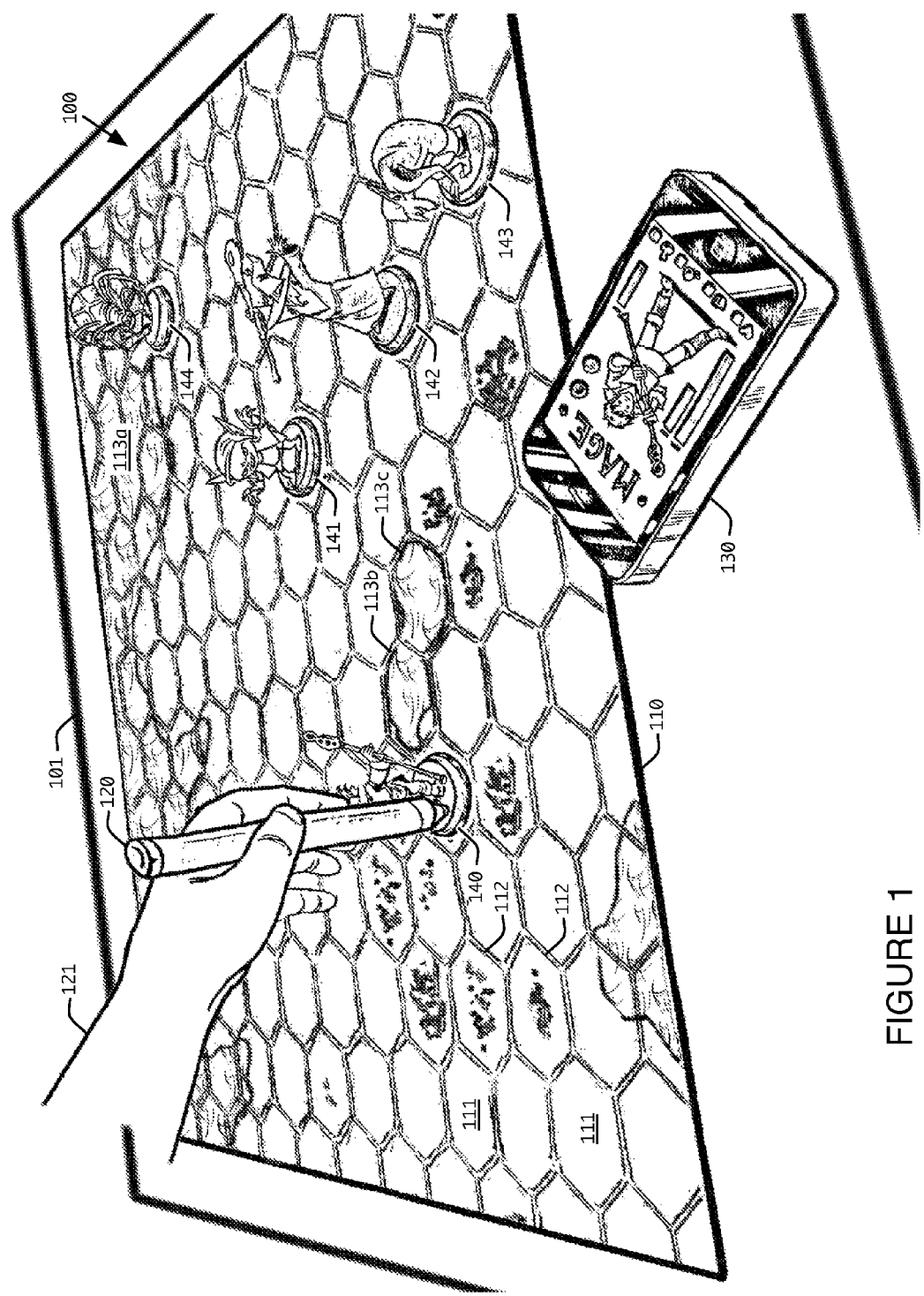
FIG. 1 is a view of an example implementation of the invention, as a board game.

Referring to FIG. 1, a game 100 implemented with the present invention is being played on tabletop 101.

Multiple play-pieces are being used, including character figurines 140-144, and map (or game board) 110. Each of the play-pieces is hand-holdable and easily moved for during play, for portability, and for storage. Each of the play-pieces (i.e., map 110 and character figurines 140-144) has multiple machine-readable indicia, not seen at this scale. A reader 120 is held by user 121 to read one indicium at a time. The reader 120 is in communication with a computer, here shown as smartphone 130, which could instead be a tablet or other computer device. The smartphone 130 receives data corresponding to the indicium being read, in this case a play-piece identifier (or "character identifier" or "CharacterID") for play-piece figurine 140. In response, the smartphone 130 brings up a status screen showing the current status of the character represented by the play-piece figurine 140. On map 110, multiple indicia identify each different location, or each different region. In the example map 110 of FIG. 1, the map is divided into hexagonal cells, but the cells could be square, or irregular, and in some embodiments need not be visually distinguishable to the player, as a matter of aesthetics. Each cell in the map can have a unique location (e.g., each desert hex 111, forest hex 112, and water hexes 113 can have a unique location indicium). Alternatively, for some embodiments, all the water hexes (e.g., 113*a*) forming the sea on the far side of the map 110 could have the duplicate indicia and be treated as a single, undifferentiated region, whether or not the individual cells in the sea are visible as shown here.

Figure 2:
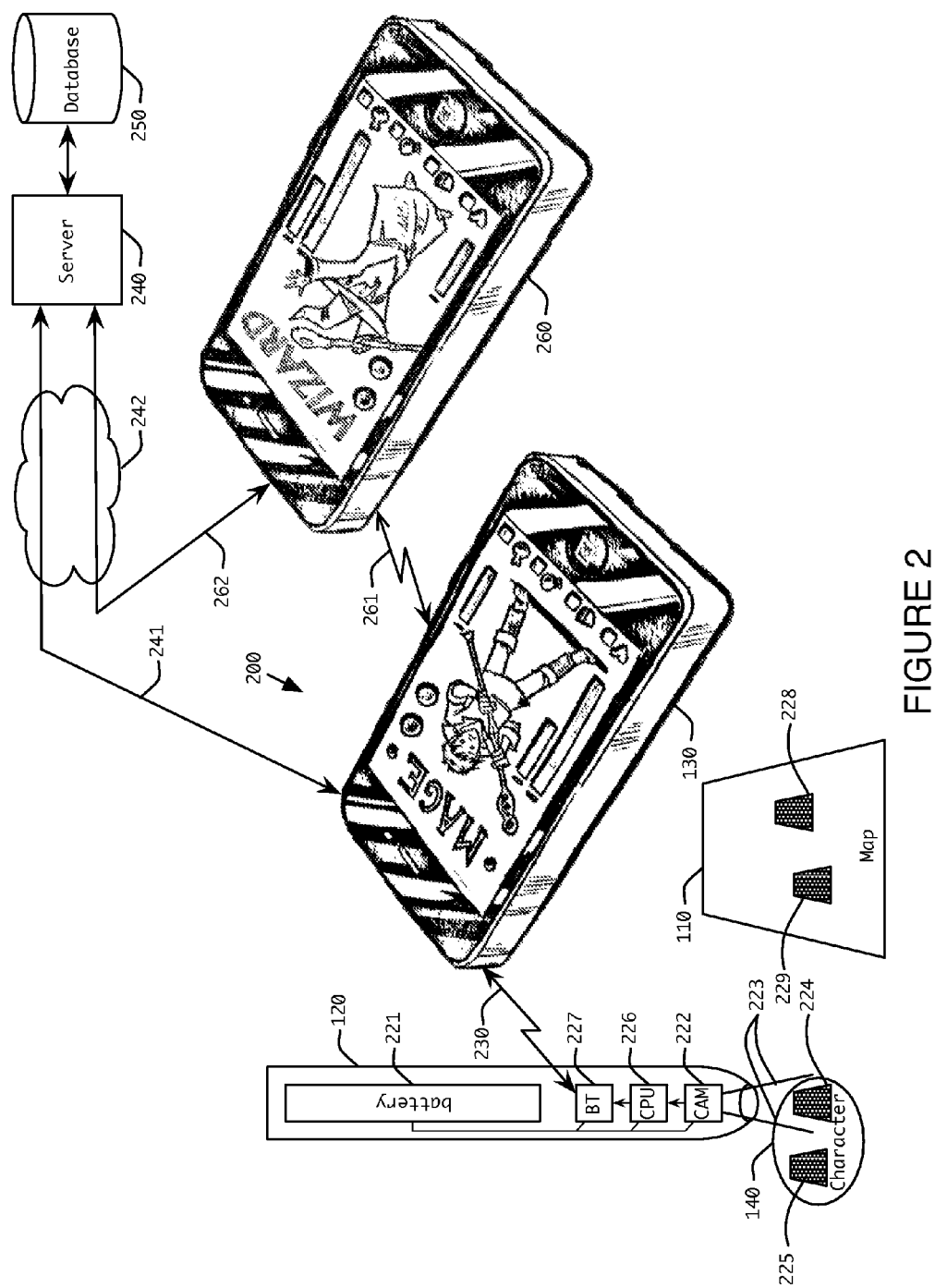
FIG. 2 is a block diagram of an example computer system to use the invention.

A block diagram of the game system 200 is shown in FIG. 2, where the character figurine 140 and map 110, each a play-piece, are shown (more abstractly) with two indicia each, the character figurine 140 having different indicia 224 and 225, and the map 110 having different indicia 228 and 229.

Reader 120 comprises processor module 226 connected to a sensor module (e.g., camera 222) for detecting indicia (in this embodiment a camera). The processor module 226 is also connected to a communication module 227 (e.g., a Bluetooth module) to allow communication with computer (smart phone) 130 through wireless connection 230. A power source 221 is also provided to drive the processor, communication, and sensor modules. Character figurine 140 is shown with two indicia 224, 225, of which one is currently selected by the player for reading with reader 120. Camera 222 (or other sensor, e.g., a barcode reader), is able to detect indicium 224 when it is within a detection zone, e.g., the field-of-view 223 for camera 222, which also allows indicium 225 to be excluded. The image from camera 222 (or other sensor signal, e.g., a barcode signal) is provided to processor module 226, and processed for transmission via communication module 227 to smartphone 130. In other embodiments, where the detection zone (e.g., field-of-view 223) might be wider, the processor module 226 (or smartphone 130) would be programmed to consider the strongest, or most central detection to determine which of multiple indicia is selected.

Each indicium, e.g., 224, is readable as a particular, corresponding data. In general, the data corresponding to an indicium represents at least one of a play-piece identifier (e.g., of all the characters known to the system 200, the one that is character figurine 140, or of all the maps known to the system 200, the one that is map 110), a location on a map (e.g., indicia 228, 229, each indicate a distinct map location), or a command (e.g., the data represented by indicium 224 might represent a command to "attack" and indicium 225 might represent a command to move, as discussed further below.) The data read from an indicium may represent more than one of these at a time, e.g., the data read from indicium 224 might represent both an identifier of character figurine 140 and a command to attack; while both indicia 228, 229 represent a play-piece identifier for map 110, while each one also represents a different map location. Two indicia are shown on map 110 in FIG. 2, for clarity, but as discussed above, there could be as many as one indicium per region of map, or the same indicium may be many times repeated (as for the sea hexes 113*a*).

The indicia need not be visible to the player, and frequently this is the preferred case for aesthetic reasons. However, if the indicia are visible to the player, they need not be readable by, the player, though they may be readable by the player. It can be the case that only reader 120 can detect the indicia, though in such cases there may be a visible indication (e.g., the hexagons) to aid in the positioning of reader 120 by the player for selection of a corresponding indicium. Thus, the indicia on map 110 can be effectively invisible, but with the cell bounds (here, hexes) of the map visible, the player can select a inside of a cell with reader 120 and in so doing present the appropriate indicium, though invisible to the player, to reader 120. On map 110, even if there were no cell markings (i.e., the hexagonal grid was not printed), a player could designate a location with reader 120 and the indicia most prominent to reader 120 would be detected. In other embodiments (discussed below in conjunction with FIGS. 6 & 7), the indicia can even differentiate within a cell. In still other embodiments, the location of indicia may be may be indicated to players by an obvious indicator, e.g., a dot or other symbol, which tells the player where to place the reader on a play-piece. In the case of differentiation within a cell, such an embodiment could provide multiple dots indicating a position away from the boundaries of the differentiated areas within a cell. In yet another embodiment, the machine-readable indicia may be human-visible, if not human-readable, appearing for example as a spot, line, or discoloration.

A suitable kind of indicium is the OID2 or "Optical Identification" patterns marketed by Sonix Technology Co., Ltd. of Chupei City, Hsinchu, Taiwan, for which their infrared imaging sensor SN9S102CE and decoder processor SN9P701FG are well suited to detect and decode into the corresponding data and may be used in an implementation of reader 120. OID2 technology operates as taught by Tsai Yao-Hung in U.S. Pat. Nos. 7,328,845 and 7,669,774. Using the OID2 technology, indicia can be as small as 1.3 mm square, and can be printed directly onto play-pieces, or may be printed onto stickers, which are then applied to play-pieces. By way of example, and without limitation, other suitable indicia include barcodes, both regular and two-dimensional (e.g., QR codes). Indicia may be cast, embossed, etched, printed, stamped, engraved, burned, or otherwise provided on play-pieces of the present invention for use with a compatible reader 120.

By way of example, the Sonix OID2 technology provides indicia representative of arbitrary 16-bit data. In the case of a map play-piece, assuming a 32×32 grid of cells, ten bits would be required to identify each of the {x,y} coordinates (five bits being required to represent 32 cell positions along one axis), leaving six bits remaining to uniquely identify one of 64. Alternatively, the map can have its own unique 16-bit identifier, and the six bits remaining can be used as a hash value of the 16-bit identifier and the {x,y} coordinate values. In the case of a character play-piece, only three bits are needed to provide up to eight commands, leaving thirteen bits to uniquely identify a character (for 8,192 unique characters). In still other embodiments, the 16-bit values can represent one of 65,536 values which could be individually associated to map cells and character play-piece commands, without any particular bit fields being prescribed, thereby relying on the database to interpret to which meaning (e.g., combination of one or more of identity, location, command) the data represented by an indicium corresponds.

Game system 200 may communicate with a remote server 240, e.g., by connection 241 which may comprise the Internet 242. Connection 241 can allow smartphone 130 to download game information from remote database 250 to be stored locally by smartphone 130, or may allow information stored by smartphone 130 to be uploaded into remote database 250.

Further, reporting of game results might be sent to server 240 and stored in database 250 for later analysis (e.g., to determine whether a character figurine 140 wins more or less than expected, to determine the frequency with which certain game actions are taken and their frequency of success, etc. as might be usable to improve the game design).

Database 250 may also contain information and updates not previously loaded by smartphone 130 (or computer 260 discussed below), and a connection with server 240 would allow these updated to be downloaded locally, for example when the player acquires a new character figurine 140, not previously available, the connection to database 250 would be used to inform smartphone 130 about the information regarding character figurine 140, and to acquire the media assets corresponding to character figurine 140. Prior to such a download, reader 120 might be able to read a play-piece identifier (e.g., from indicium 224), but smartphone 130 might not know anything about the character so identified. This can prompt smartphone 130 to connect with server 240 and acquire information about play-piece 140.

While playing game 100, smartphone 130 may have communication with another similar player's computer (e.g., smartphone 260). Smartphone 260 may have its own reader (not shown) like reader 120. In this arrangement, two co-located players, sharing a common map 110, can play without continuously needing to exchange reader 120 and without needing to take turns using smartphone 130. While co-located, the players' computers (smartphones 130, 260) can communicate directly through wireless connection 261.

In another embodiment, the two players using individual computers (smartphones 130, 260) may be at different locations, and each have a duplicate of map 110. In this case, communication between their computers (smartphones 130 and 260) may be facilitated by server 240 via connections 241 and 262. In some embodiments, once the initial communication between the two smartphones 130 and 260 is established, a peer-to-peer connection (not shown) may be established between them and no longer require server 240.

In another embodiments, server 240 may implement processes used in the course of game play. This may be appropriate when computers 130 and 260 are playing together but are not co-located.

FIGS. 3a and 3b show the front and back, respectively, of character play-piece 140, in this instance a dimensional figurine 301 sitting atop a base 302.

In this embodiment, the name 316 of the character is seen in FIG. 3b, on the base 302, behind figurine 301. Adjacent to name 316 is a region 315, in this embodiment comprising a player-visible coat-of-arms 315, and further comprising a machine-readable indicium representing data that corresponds to the identifier for character play-piece 140. When reader 120 detects the indicium in region 315 with the sensor module (e.g., camera 222), processor module 226 can produce the corresponding data (the identifier) and send it with communication module 227 to smartphone 130 and smartphone 130 uses this to determine that character figurine 140 has been selected and to further access data related to character figurine 140.

As shown in FIG. 3a, other regions 310-314 are shown in front of character figurine 140, each comprising a player-readable icon suitable for use in example game 100: Region 310 shows crossed swords icon and presents the character's attack value; region 311 shows a heart icon and presents the character's peak health hit-point value; region 312 shows a runner icon and the character's speed value; region 313 shows a shield icon and the character's defense value; and region 314 shows a scroll icon and the character's magic value. Each region 310-314 further comprises a different machine-readable indicium, each indicium representing data that corresponds to the icon. Thus, by placing the detection zone (e.g., field-of-view 223) of reader 120 over region 314, for example, smartphone 130 receives data indicating that the magic icon was selected. Each such data may further correspond to the character figurine 140, so that, for example, when the reader 120 is positioned over region 312, smartphone 130 can know that the speed icon on character figurine 140 has been selected.

In an alternative embodiment, indicia may be provided on the figurine body 301 rather than the base 302, and may associated by implement or body-part, rather than with human-readable icons. For example, in lieu of region 314 indicated to the player by the scroll icon, the selection of magic may be made by pointing the reader 120 at the end of the magic staff 318 that is a part of figurine body 301, the end of the staff 318 bearing the machine-readable indicium that when read will indicate that magic was selected. A hand or weapon of the figurine might have an indicium to indicate an attack, while shoes might have the indicia for movement, etc.

This configuration of multiple machine-readable indicia at distinct locations on play-piece 140 allows the play-piece 140 to be a controller for the game 100. The play-piece can be identified by pointing reader 120 at region 315, and various status displays can be recalled or commands given (depending on the design and state of game 100), by pointing reader 120 at one of regions 310-314. In some cases, identifying a play-piece (e.g., with reader 120 directed at region 315) can make that play-piece the direct object of a command (i.e., the target of the command), as discussed further below.

Figure 4B:
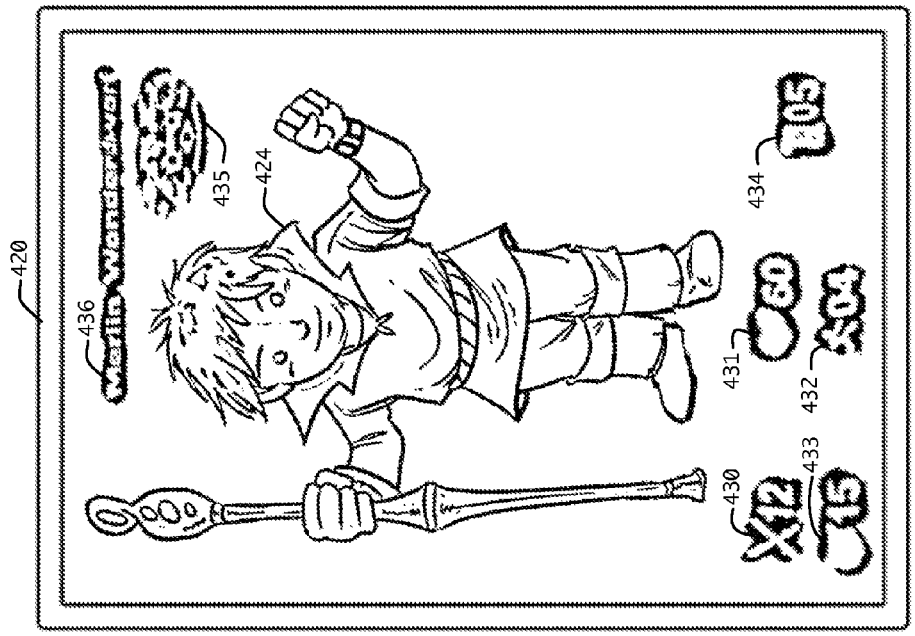
FIGS. 4A and 4B are other embodiments of the play-piece, as a printed cardboard figure, and as a playing card.
Figure 4A:
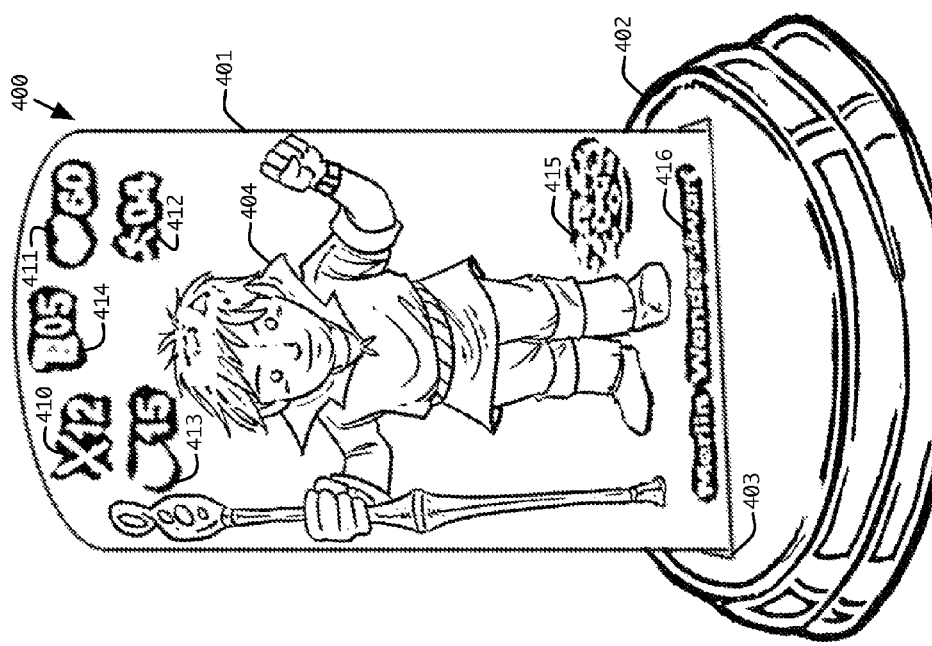

In another example embodiment, shown in FIG. 4a, play-piece 400 may comprise a cardboard placard 401 inserted into a slot 403 in base 402, with a representation 404 of the corresponding character printed thereon. Human-readable character name 416 corresponds to name 316, and regions 410-415 correspond in purpose and function to regions 310-315.

In still another example embodiment, shown in FIG. 4b, play-piece 420 may be a playing card with a representation 424 of the corresponding character printed thereon. Human-readable character name 436 corresponds to name 316, and regions 430-435 correspond in purpose and function to regions 310-315.

Figure 5A:
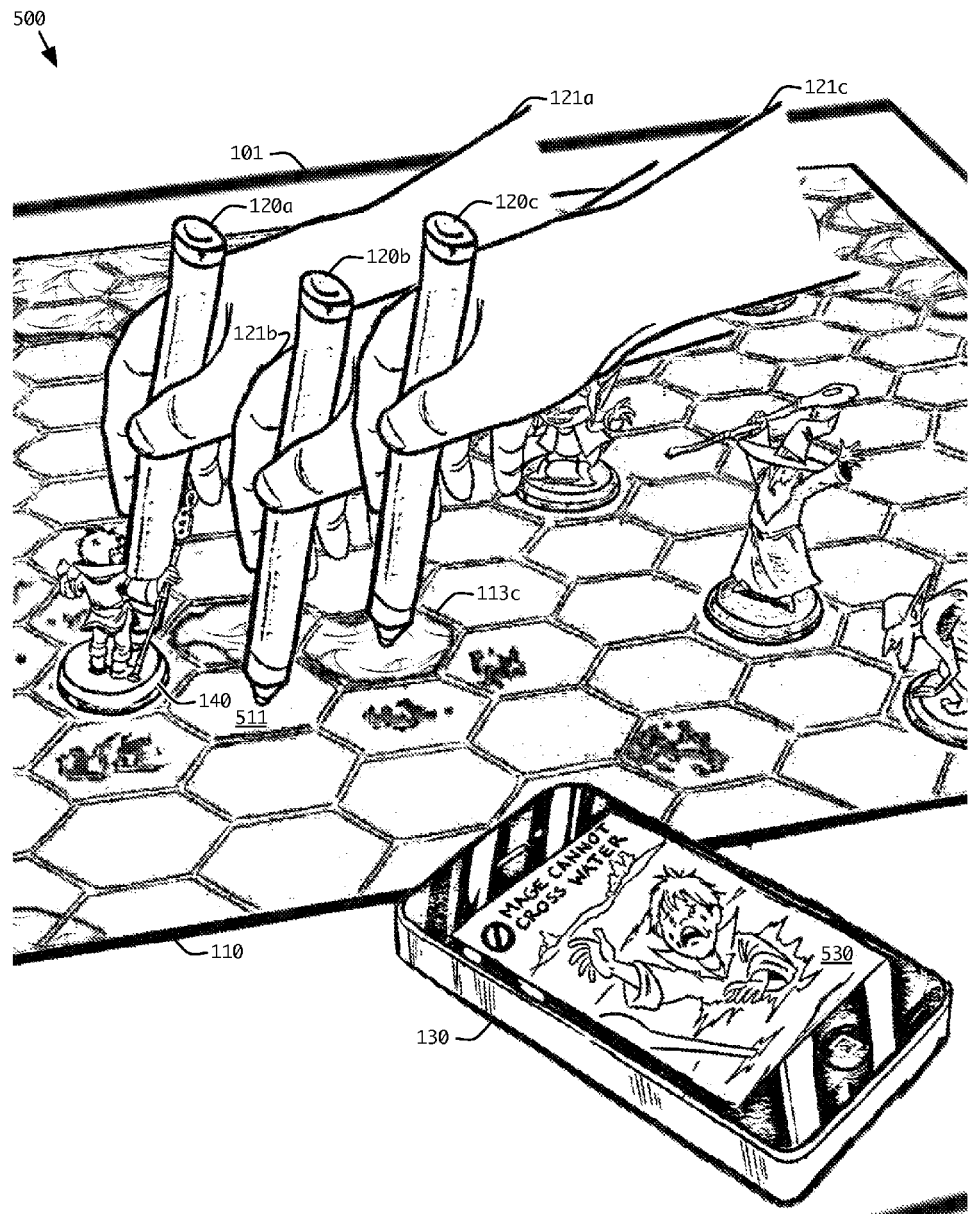
FIG. 5A depicts an unsuccessful movement as an example of game play using the present invention.

An example of game play is shown in FIG. 5A that shows a movement sequence 500 of a play-piece (character figurine 140). The player (shown first as hand 121a) directs the reader 120 (shown as reader 120a) at the movement icon (see region 312) on FIG. 140 so that the corresponding indicium is read and corresponding data communicated to smartphone 130. Then, the player (shown next as hand 121b) uses the reader (at 120b) to read cell 511, providing data corresponding to a location on map 110 to smartphone 130. As this location (cell 511) is adjacent to the current position of FIG. 140 as known to the computer, that move is legal, but as the player (now as hand 121c) directs the reader (at 120c) to detect within cell 113c, which depicts a water hex (i.e., a lake), and the corresponding data is sent to smartphone 130 which uses the data to detect that a game rule has been violated: Mages (the kind of magician represented by the play-piece, that is, character figurine 140) are not allowed to cross bodies of water (at least, in this game, not by normal movement), and the display of smartphone 130 is updated with presentation 530 to indicate this. Depending on the rules of the game, the movement of character figurine 140 may end at cell 511, or the whole movement might be started over, or the player may need to return to position 121b with the reader at 120b, to resume the movement turn from the most recent legal position, perhaps having expended a movement in the failed attempt to enter cell 113c, or still other rules might be triggered (e.g., the mage may have been injured by near-drowning).

Figure 5B:
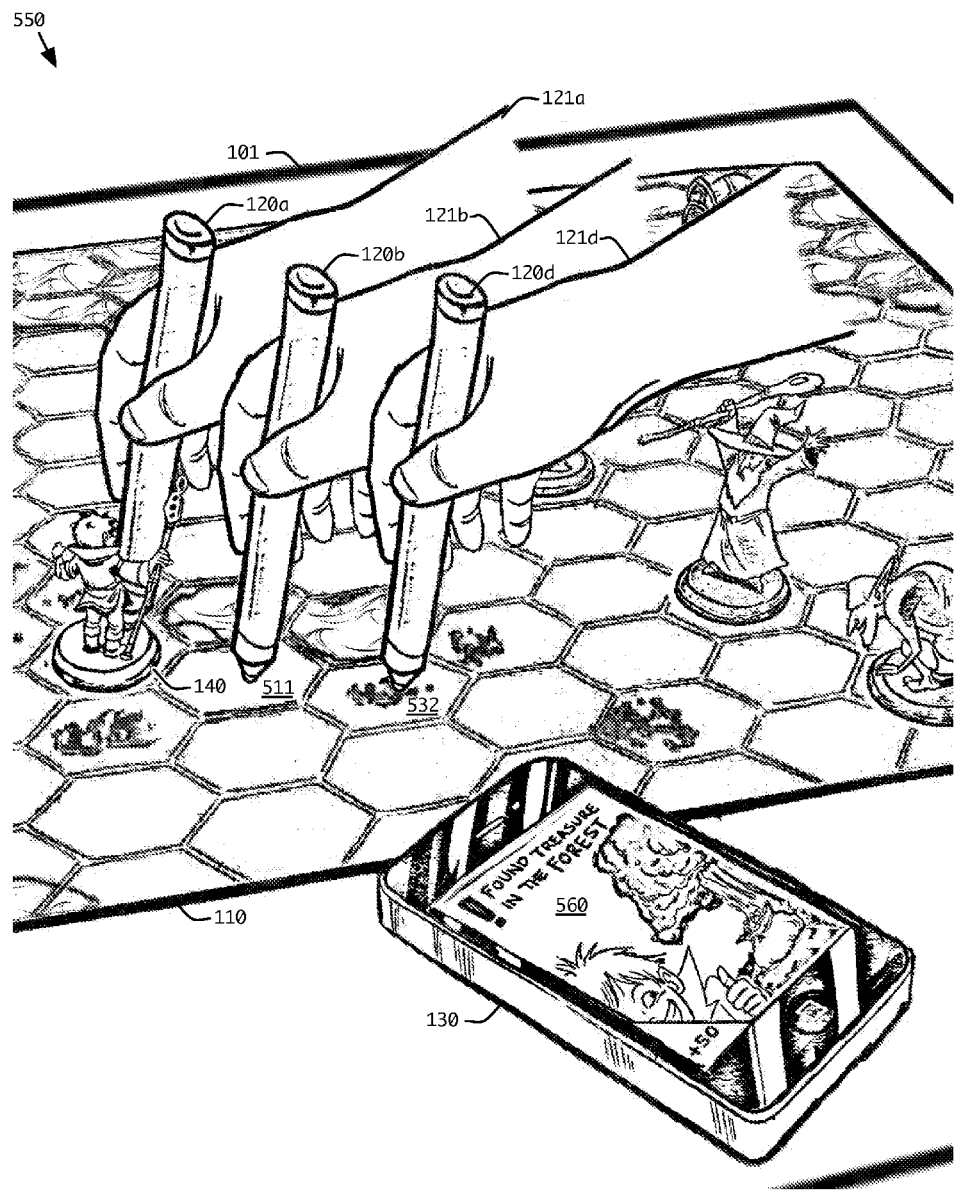
FIG. 5B depicts a successful movement.

In the example of FIG. 5A, the regions on the map have characteristics visible to the player that correspond to the behavior exhibited as the game executes: The character figurine 140 is allowed to traverse the plains represented by cell 511 unimpeded (which the player may know), but traversal of the body of water represented by cell 113c is not permitted (which the player may know, or may just have learned, but now knows). In FIG. 5B, a different kind of interaction is shown by movement sequence 550, which begins as in FIG. 5A up until the reader at 120b detects in cell 511, and the player this time proceeds (at position 121d) to direct the reader (now 120d) into cell 532, a forest hex, and the reader communicates the corresponding data to smartphone 130, which per the rules of this example game, determines that the mage 140 finds a hidden treasure at cell 532, as shown in presentation 560 on the display of smartphone 130. In this case, map 110 bore no indication that there was treasure hidden at cell 532. Rather, the treasure was associated with cell 532 of the map 110 in the game database stored in smartphone 130, and now that the treasure has been found, that association is transferred to the play-piece 140 (i.e., the mage now has the treasure) and the next player to move a character into the forest cell 532 will not find the treasure again. Depending on the rules of the game, finding the treasure may have further depended on a skill of the character represented by the play-piece (character figurine 140), where that skill is stored in the game database, or may have depended on luck (i.e., a matter of chance), or both (i.e., some characters having a better chance than others).

Figure 6:
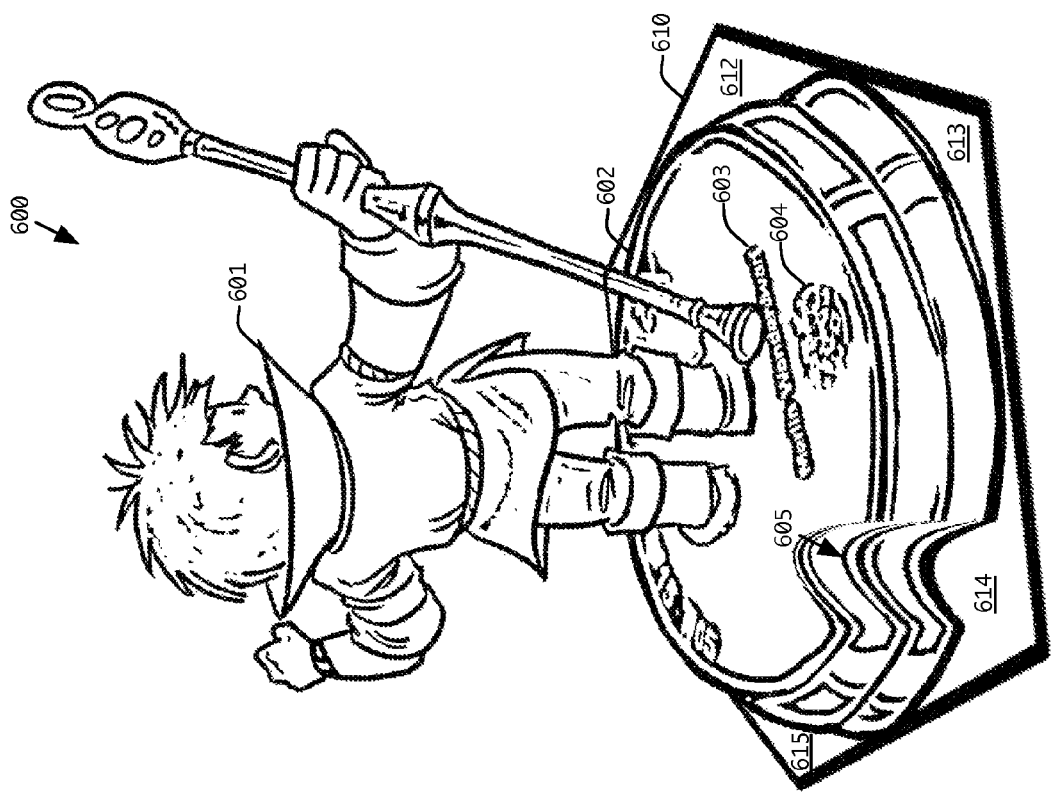
FIG. 6 depicts another version of a play-piece having an opening to allow reading of orientation with respect to an underlying map.

In some embodiments, game rules may take into consideration the facing of a play-piece within a cell on a map. A mechanism is shown in FIG. 6 for determining the orientation of a play-piece 600 as it sits on map cell 610. Play-piece 600 comprises figurine 601 and base 602 having name 603 and a region 604 similar to region 315. However, base 602 has notch 605 (or a hole, not shown) that reveals different portions of cell 610, depending on the facing of play-piece 600. As shown in FIG. 6, cell 610, a hexagon, has segments 612-615 nearest to each vertex (and two other vertices not clearly seen in FIG. 6.) Notch 605 reveals enough of segment 614 that reader 120 could be positioned over notch 605 (or a hole in base 602), to read an indicium located there. The data corresponding to that indicium would indicate not only the location of the cell 610, but also the facing of a play-piece located there.

Figure 7:
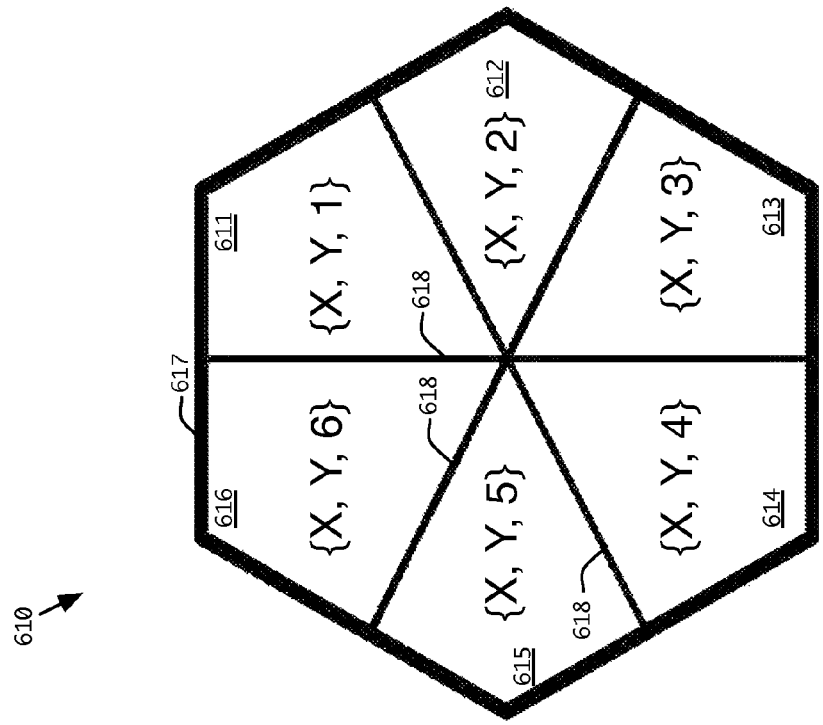
FIG. 7 shows the layout of different indicia in a cell of the map for use when determining the orientation of the play-piece of FIG. 6.

FIG. 7 shows a schematic layout of cell 610, including the six segments 611-616 within hexagon 617 and divided by separations 618. Separations 618 do not need to be visible to the player. In this example, the machine-readable indicium in each segment corresponds to data associated with the location of cell 610, here shown as the coordinates $\{X,Y\}$ common to all six segments 611-616. Additionally, each indicium further corresponds to data associated with an orientation, shown as a third coordinate having values 1-6. Thus, when reader 120 is directed through notch 605 in FIG. 6, it is directed at segment 614 and the indicium there is read and the corresponding data allows the smartphone 130 to determine, from $\{X, Y, 4\}$ triplet, both the position and orientation of play-piece 600.

Figure 8:
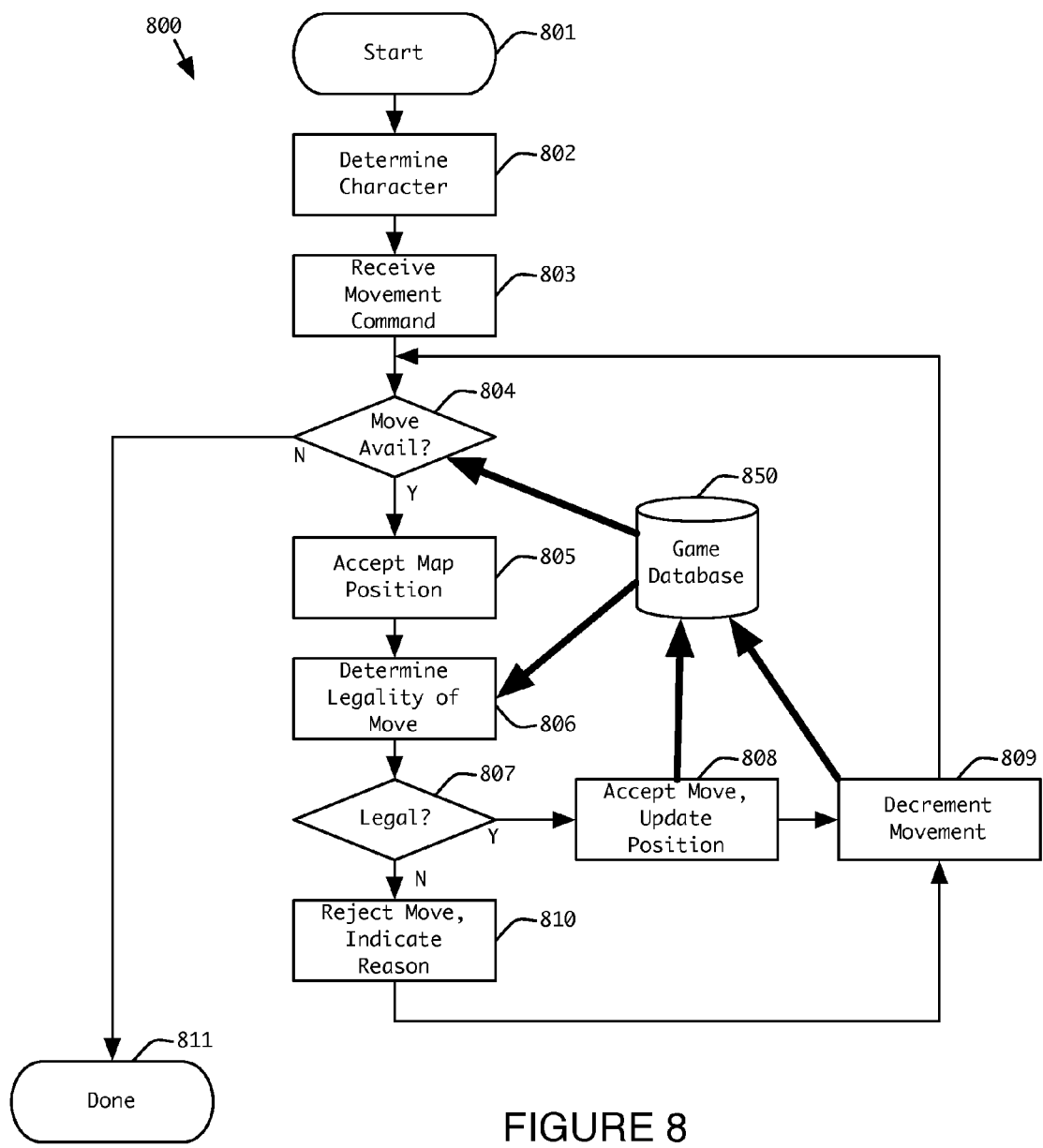
FIG. 8 is a flowchart for a process of moving a play-piece in a game of the present invention.
Figure 9:
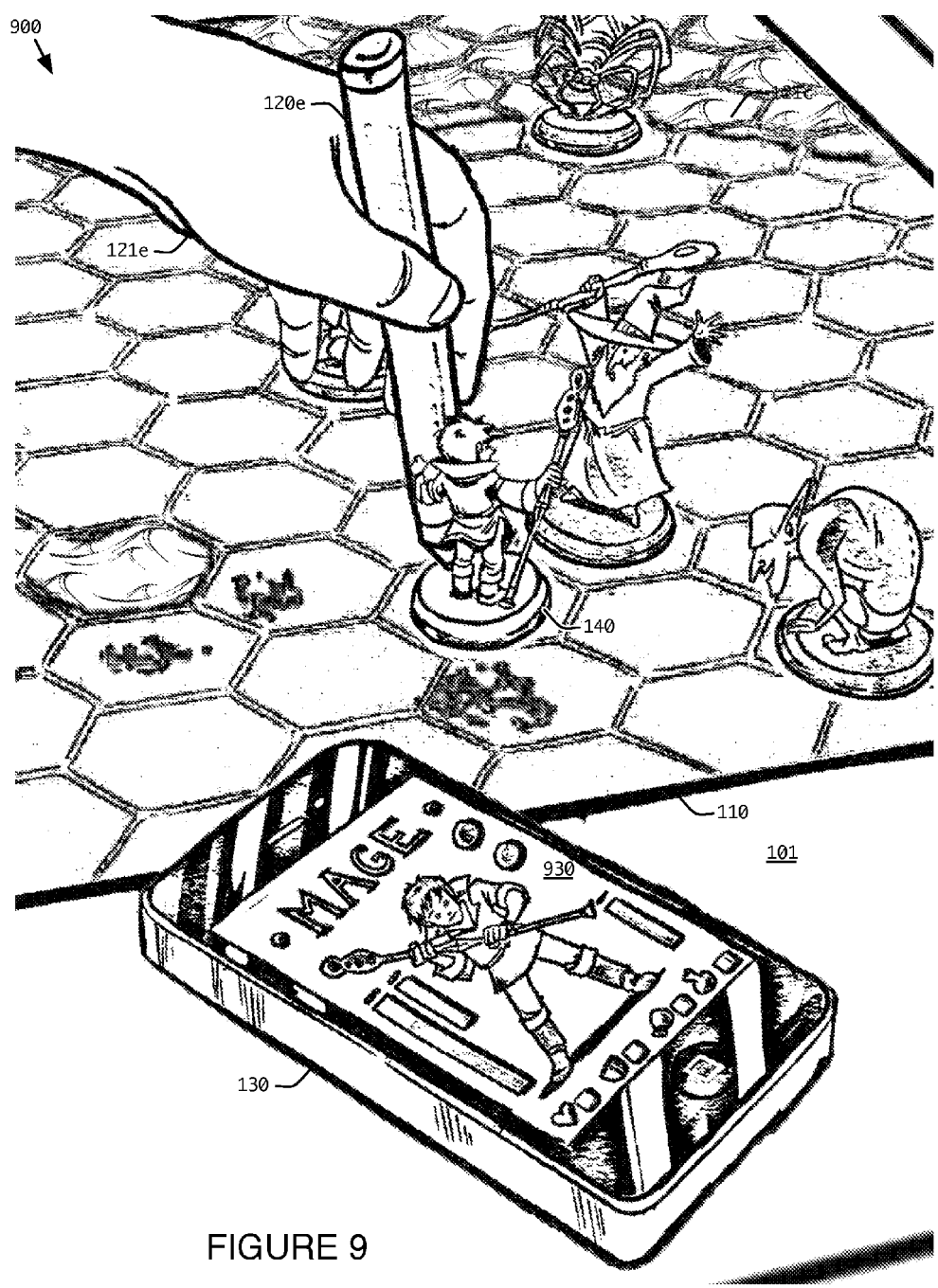
FIGS. 9-12 depict an example sequence of steps for performing an action in the game (in this case, a magical attack)

FIG. 8 shows a flowchart for an example movement process 800 for games of the present invention. Movement process begins at 801 with the game in progress and the database initialized to represent the game map (e.g., 110), including the current positions of the characters (e.g., 140-144), visible attributes of the map (e.g., plains 111, 511, forests 112, 532, and water 113a-113c, etc.), and non-visible attributes or associations (e.g., the treasure of sequence 550 in FIG. 5B).

At 802, the current character is determined. Depending on the rules, this determination may come from the fact that it is a particular character's turn, in which case the character is automatically determined. Alternatively, the determination of the current character may come from a selection the player makes by pointing reader 120 at a particular character play-piece so that an indicium is read and returns data to the smartphone 130 that identifies the character.

At 803, smartphone 130 receives data indicative of a movement command as a result of the player directing the reader 120 at a region (e.g., 312) having a machine-readable indicium associated with the movement command.

As discussed above, the indicia on a character play-piece (e.g., 140) may represent both a command (e.g., move) and the identity of the character. Thus, in such an embodiment, steps 802 and 803 may be both performed in response to a single detection by reader 120 of the indicium in region 312.

At 804, a check is made as to whether the current character has any moves remaining. As an example rule, a character's movement allowance may be shown to the player (e.g., where in region 312, the movement allowance of "04" is visible to the player). Smartphone 130 determines the movement allowance remaining for the current character from game database 850. If there is no further movement allowed, the movement process ends at 811.

Otherwise, as there is further movement allowed, at step 805 the process accepts a map position determined when the player directs the reader 120 at the map to select the next position.

The next position is tested at step 806 to determine whether it represents a legal move, according to the rules of the game and the current status in game database 850 (e.g., whether the next position is adjacent to the current position and whether the current character is permitted and otherwise able to enter the next position).

At step 807, if the next position corresponded to an illegal move, then process 800 continues at step 810 where the move to the next position is rejected and the reason for the rejection is displayed (e.g., by presentation 530). After step 810, the process continues at step 809 so that the remaining movement allowance is decremented, and then loops back to step 804. In embodiments where the rules do not call for forfeit of a movement allowance when an illegal move is attempted, step 809 may be skipped following step 810.

If, at step 807, the next position provided corresponded to a legal move, then at step 808 the move is accepted and the position of the current character is updated in the game data 850 to the next position. In some cases, this includes determining and performing any special activities associated with the new position (e.g., finding the treasure as in sequence 550).

At step 809, the remaining movement allowance is decremented and the process loops back to step 804.

Note that at any occurrence of step 804, the player might choose to end movement, e.g., by selecting a command or a different figure using the reader 120. In such a case, movement process ends at step 811.

Another example of game play is shown in FIGS. 9-12, showing a magical attack sequence beginning with step 900 where it is the mage's turn as shown by the presentation 930 on the display of smartphone 130, and the player (shown as hand 121e) uses the reader (shown as reader 120e) to read the indicium in region 314 (near the scroll icon in FIG. 3a) of play-piece 140, thereby indicating a command to use magic.

Figure 10:
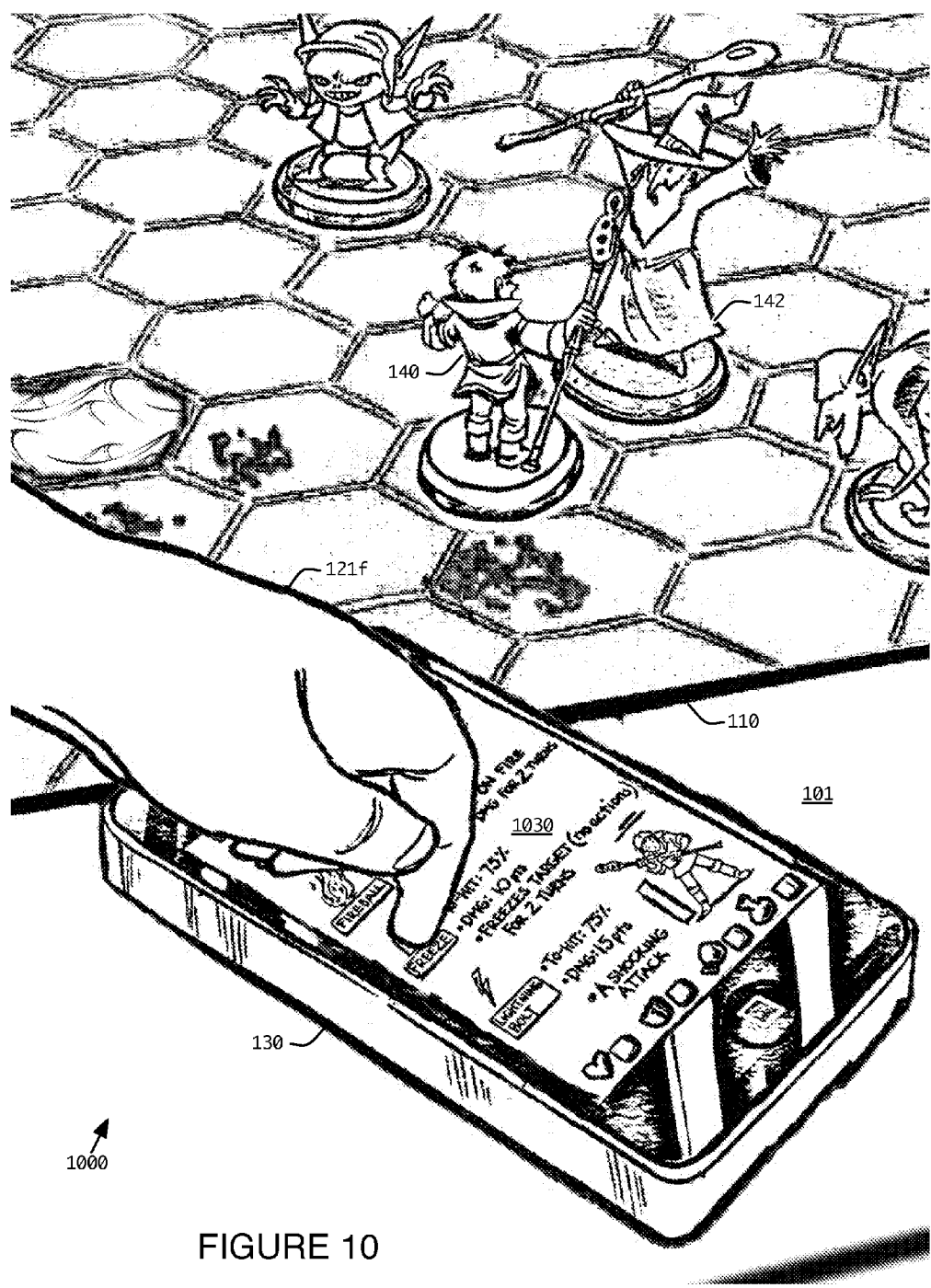

In FIG. 10, at step 1000, the display of smartphone 130 now shows presentation 1030, which includes a list of available of magic spells, and the player selects from the list, here using a touchscreen interface of the smartphone 130, though this selection could be made from a printed menu (not shown) comprising the list of spells and machine-readable indicia to be detected by reader 120. In cases where there is no choice of options (e.g., the character can use only one spell in this circumstance), the selection may be automatic.

Figure 11:

Once the spell is determined, as shown by FIG. 11 in step 1100, the presentation 1130 on the display of smartphone 130 calls for the player to identify a target for the spell. The player (shown as hand 121g) complies by using the reader (shown as reader 120g) to read an indicium on evil wizard play-piece 142 to provide the identifier data.

Figure 12:
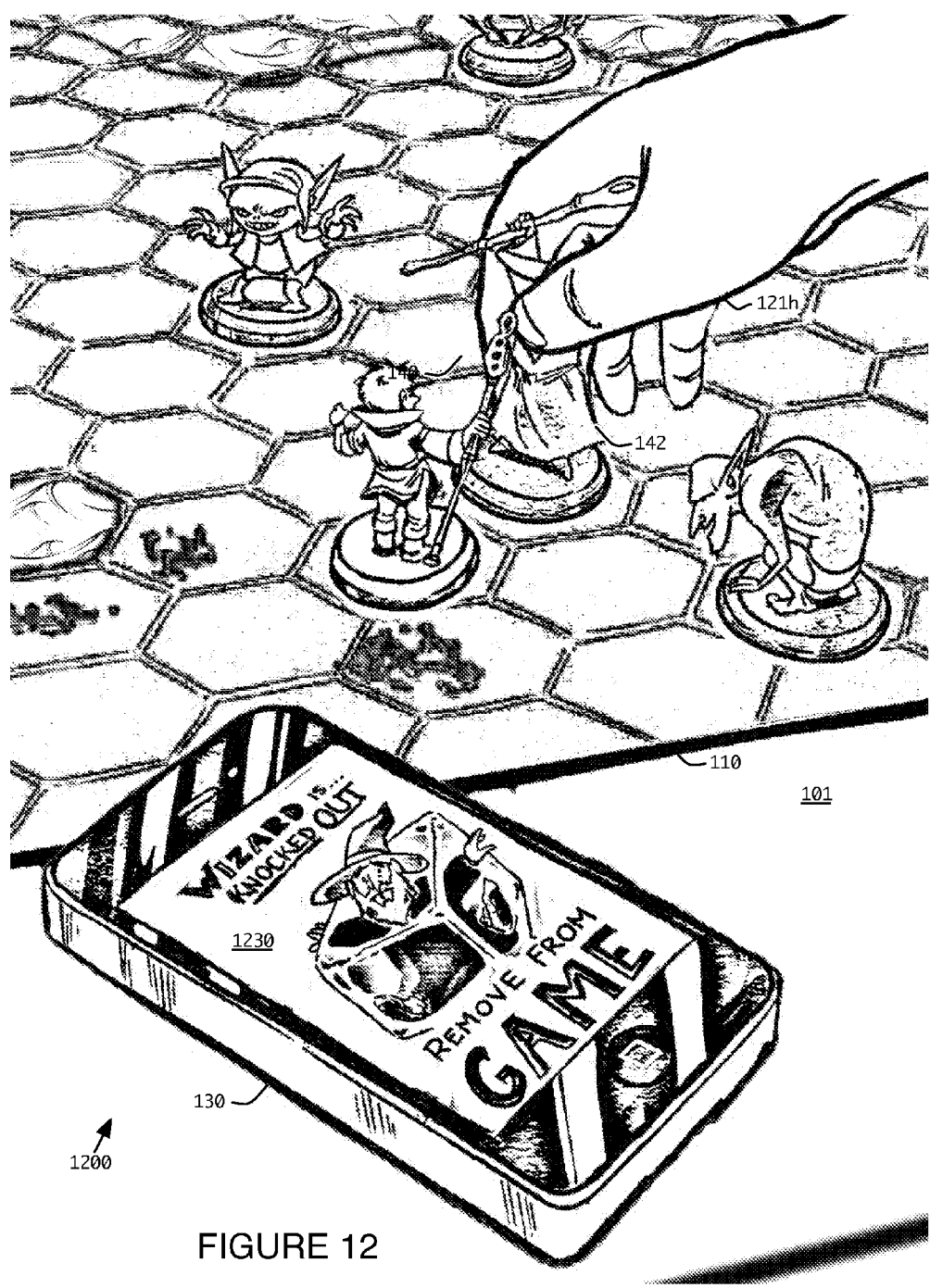

In FIG. 12, the outcome of the attack is determined in step 1200, based on the current character (mage 140), the selected spell ("Freeze", shown in presentations 1030 and 1130), and the target character (evil wizard 142). The result is displayed on smartphone 130 as presentation 1230. The player (shown as hand 121h) follows the outcome given by removing evil wizard play-piece 142 from the map 110.

Figure 13:
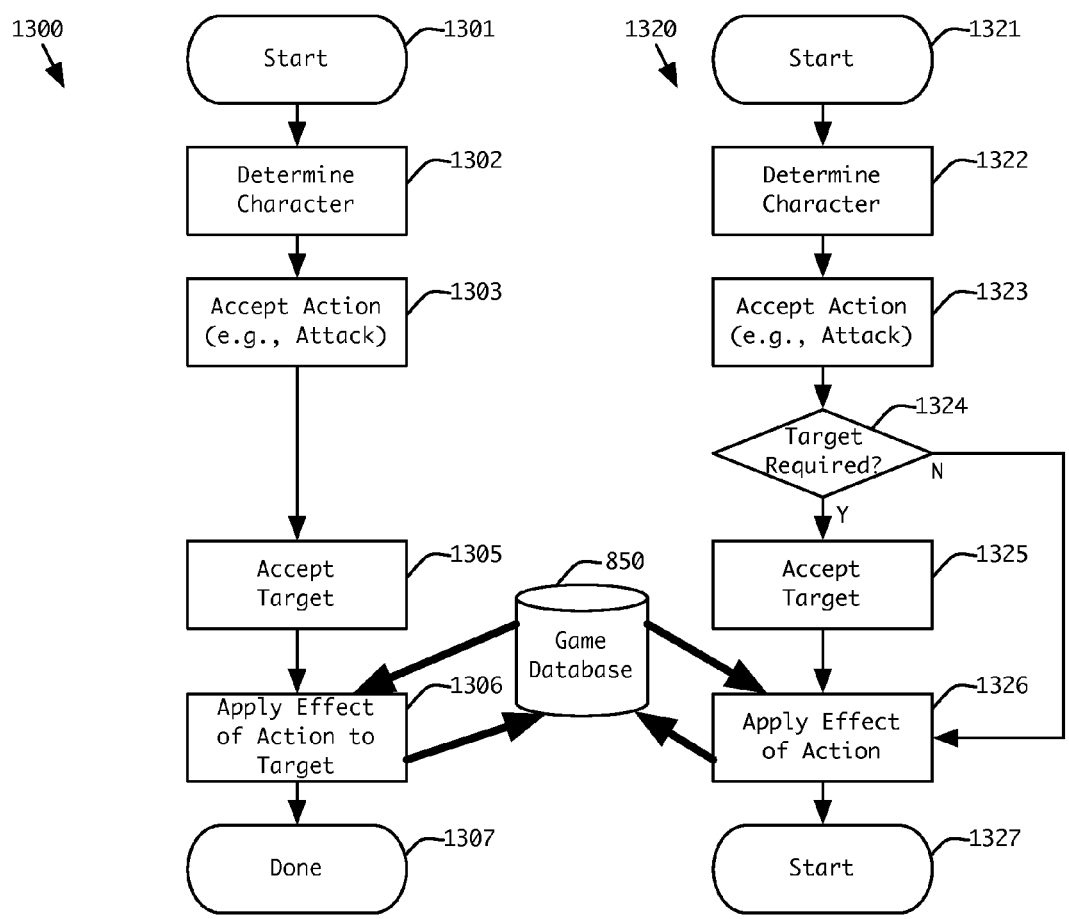
FIG. 13 is a flowchart for a process of resolving actions in an example game; and, FIG. 14 is an example database schema suitable for implementing the example game.

FIG. 13 shows two more flowcharts, each for another example game turn process 1300 and 1320, and each of which begins at step 1301/1321 (respectively throughout) with a game database 850 ready for use.

At step 1302/1322, the current character is determined. In one situation, this may be determined because the current character is unchanging (e.g., in a solo game or a game where, for the moment, there is only one character). Alternatively, the current character may be determined by a turn sequence, which may be established at the beginning of the game or may be established at different times through the game (e.g., "initiative rolls" used to determine combat order as in Dungeons and Dragons, 4th edition, published by Wizards of the Coast, LLC, of Renton, Wash.). In still another way, the current play-piece, for example character figurine 140, may be selected another way and the selection indicated to the system by detecting an indicium with reader 120 and sending corresponding data to smartphone 130, where the data is associated with a play-piece identity. This last alternative is useful when the rules allow a player to use his or her play-pieces in any order, so that the current play-piece is chosen by the player.

At step 1303/1323, an action, determined by the player, is accepted when an indicium is detected with reader 120 and the corresponding data is sent to smartphone 130, where the data is associated with an action, (e.g., "attack" or "cast magic", or "show status").

In some embodiments, the same indicium may have corresponding data that determines both a play-piece identity (used in step 1302/1322) with which the current play-piece is determined, and an action accepted to be performed (in step 1303/1323). This approach can make the user experience of playing the game easier and more efficient.

In game turn process 1300, at step 1305, a target is accepted when reader 120 detects an indicium selected by the player and sends the corresponding data to smartphone 130, where the data is associated with a play-piece identifier or a location, and the corresponding play-piece or location becomes the target of the action.

In game turn process 1302, at step 1324, a determination is first made whether the action accepted at 1323 requires a target, and if not, the process continues at step 1326, otherwise, at step 1325, a target is accepted as with step 1305.

At step 1306/1326, again respectively to game turn processes 1300/1320, there is a determination of the effects of the action accepted at 1303/1323 as the action is performed with respect to the current play-piece, with the play-piece identity or location accepted at 1305/1325 (if any) used as the target of the action. The determination of effects may be further based on data read from game database 850 (e.g., the strength of a current character might be compared to that of a target character). In some embodiments, and for some actions, the determination of effects may be further based on an input received by smartphone 130 from the player by way of an interface other than reader 120 (e.g., in step 1000 shown in FIG. 10, where the player makes a selection using a touchscreen on smartphone 130).

Then the effects are determined, they may cause in a status change to be stored in game database 850 (e.g., in step 1200, the status of evil wizard 142 is changed to "removed from game"). The effects may further be presented to the player on a display of smartphone 130 (e.g., as presentation 1230 in FIG. 12), which may comprise one or more of text, picture, and sound. Further, the effects and in some cases the action and/or target may be logged in the game database, for example to be used to reconstruct the sequence of play as a game record that can be played back or reviewed.

At step 1307/1327, the game turn processes 1300/1320 conclude. In most cases, other than at game end, this allows the next turn to take place.

Figure 14:
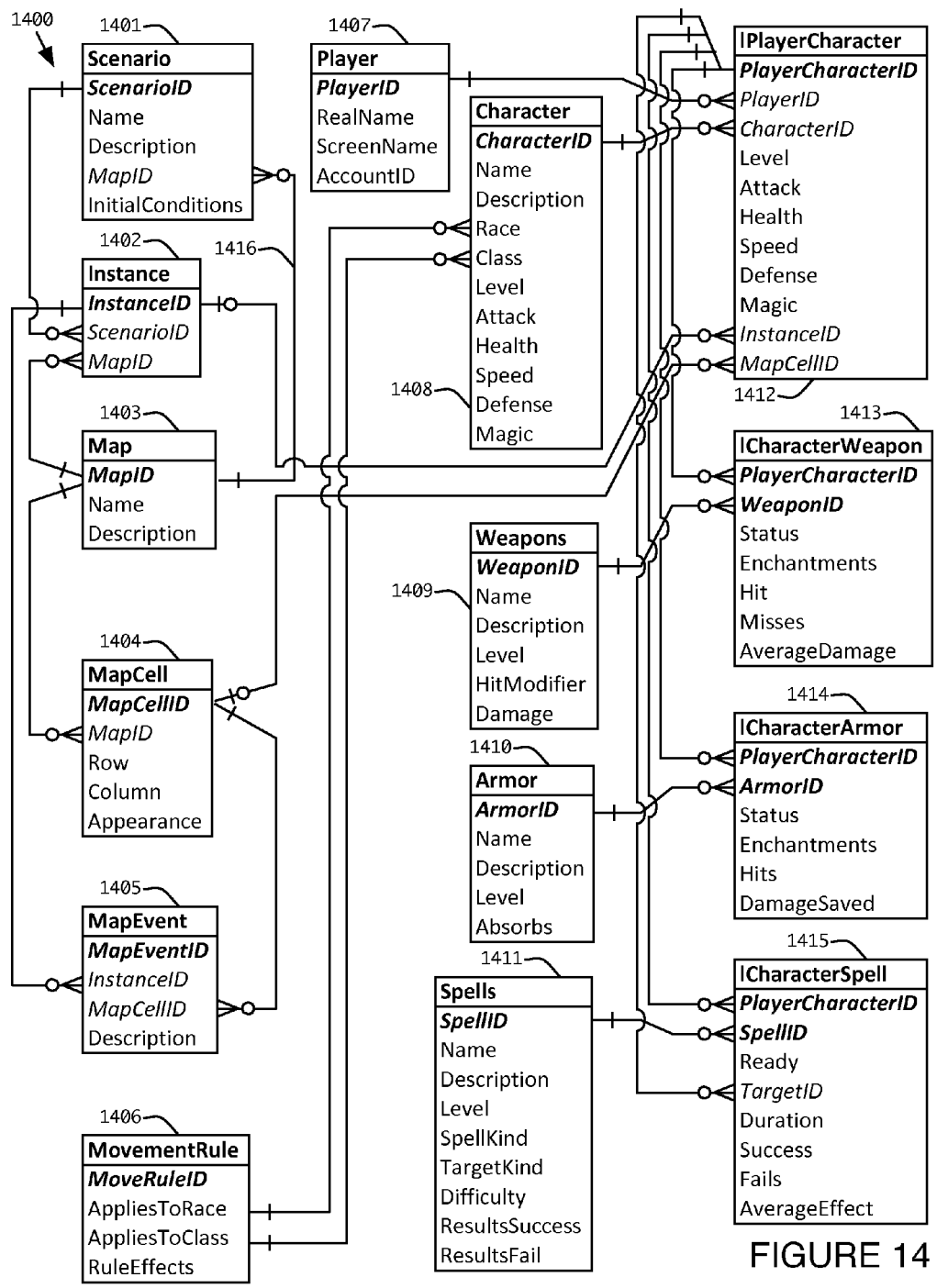

FIG. 14 shows a schema 1400 for an example game database as might be used in whole or part to implement game database 850, which may be replicated in whole or part as online, remote database 250. Typically, game database 850 as used in processes 800, 1300/1320, will be local to smartphone 130. This is for the advantages of efficiency and speed, rather than a requirement. In these cases, all or part of remote database 250 may be used to initialize or update a local game database 850 (e.g., when a player introduces a play-piece for which the corresponding data is not already loaded into local database 850), or remote database 250 may be updated from local game database 850 (e.g., to backup a player's game status, or to register game logs or outcomes, or to collect statistics on the game play). In other embodiments, remote database 250 may be used as game database 850. This could be the case when two players who are not co-located play together, e.g., with computers 130, 260, through server 240.

Example schema 1400 comprises fifteen tables. Each table shows the name of the table (in bold), and the key (in bold italic font), which in some cases (e.g., in table 1413) is a composite foreign key. Otherwise, foreign keys are shown in non-bold italic font. The remaining fields in each table are shown in a plain font. Relationships among the table fields are shown in crow's foot notation. Schema 1400 is purely exemplary, and while sufficient to implement aspects of the examples given herein is presented by way of example and not of limitation. The schema 1400 as shown is directed toward a database able to represent multiple different gaming scenarios, each of which might be used by many players, all playing independent of each other, or in small groups (i.e., like many people playing chess—they are all playing the same "scenario" or game, but outside of paired competitors, they are playing on distinct boards which do not interact). The database is also able to represent a large number of play-pieces (maps and characters/figures), which may be more numerous and more diverse than any player actually owns, yet still be able to track which figures (characters) and maps are available to which players.

Scenario table 1401 contains top-level information to describe a game scenario. In certain classes of games, a "scenario" (sometimes called a "module") might be thought of as an episode, or a chapter, in a longer game (sometimes called a "campaign"), but could also be self-contained. Some game designers might intend that a scenario be completed in a single game session of play, whereas a campaign might extend over many game sessions. The key to scenario table 1401 is the ScenarioID field, so each record in the scenario table will have a unique value for ScenarioID. This value is used to associate other records in other tables related to this scenario. These records will also have a name (for identifying the scenario to players), description (for describing the scenario to players), and an indication of initial conditions (e.g., what characters will be needed and what their starting positions will be), all in the correspondingly named fields. The MapID field (a foreign key), identifies the record corresponding to the specific map used when starting the scenario.

Map table 1403 has a name and a description for the map. In the case of a map play-piece (i.e., map 110), the identifier for the map play-piece associated with its indicia may be the key value in the MapID field, or could be stored in a different field (not shown). The MapID field uniquely identifies a map (which is not to say that a manufacturer can't make thousands of the same map with the same MapID, but that when they do, the maps are interchangeable). For example, ten different copies of map 110 would all have the same MapID and be represented in map table 1403 by the same record. Thus, however many different scenarios (each with an individual record in scenario table 1401) can be played using map 110, the corresponding scenario records will all have the same value for the MapID field, and that value will associated each of those scenario records with the map record in table 1403 that corresponds to map 110 thereby creating scenario-map relationship 1416. The crow's foot notation for scenario-map relationship 1416 indicates that every scenario in schema 1400 is required to be associated with exactly one map, but that each map may be associated with zero or more scenarios.

Crow's foot notation and the elements of schema design for a relational database as shown here are well known, and have been selected here for their illustrative value, which is not to suggest that other techniques, for example non-relational databases or other data structures, would not be equally suitable. The remainder of schema 1400 will be described without such detailed explanation of the fields and relationships, but to more generally describe the purpose of each table in the context of the game and other tables.

Instance table 1402 identifies a scenario and the map currently in use. This allows the same scenario to be played by different, unrelated players, yet allows the database to track their games independently and without confusion. When a player wants to start a new game, the scenario is selected and a new instance record created pointing to the scenario and to the initial map (from the scenario record). As the game progresses through the scenario, play may move to a different map (e.g., if the character figurine 140 in FIG. 1 moves to a shoreline hex bordering the sea hexes 113a, the player may be directed that play continues aboard a pirate ship and that character figurine 140 should be removed from map 110 and placed on a different map (not shown) of a pirate ship for the next stage of the game, much like a scene change in a movie. When this change is made, the MapID value in the instance record will be updated to refer to the new map.

MapCell table 1404 tracks the location and appearance data for each region in each map. The appearance field is provided so that smartphone 130 can determine the map properties, such as that cell 113c (in FIG. 5A) is a water hex, which is necessary for the determination that results in presentation 530. In this embodiment, the records of MapCell table 1404 are relatively constant, and are the same regardless of scenario.

In contrast, MapEvent table 1405 is used to track map-related information that may change, and is likely to be different in each scenario. An example of this would be the treasure hidden at cell 532 (in FIG. 5B). At the start of the game, information in the initial conditions for the scenario would have caused the treasure to be placed at map cell 532 on map 110. Once found by a player, the treasure on that cell of that map in that instance of the scenario is removed. If subsequently character figurine 140 discards the treasure, a map event record might be created in table 1405, still tied to the same instance, and (depending on the rules of the game) should the player return with a character to that location, the treasure might later be recovered.

Each player is represented by an individual record in player table 1407, and the player might be tied to an account and have other information, e.g., the player's real name and the player's screen name (a pseudonym), as determined by policy.

Each character is represented by an individual record in player table 1408. Here, a character record corresponds to a specific figure, e.g., play-piece 140. There may be many thousands of copies of play-piece 140 (the 'Mage') manufactured and owned by different players. Each player might own zero, one, or more of a particular play-piece, but that particular play-piece (i.e., the 'Mage') is represented by a corresponding record in character table 1408, regardless of how many players own however many copies. The play-piece identifying data corresponding to the play-piece indicia may be the CharacterID, or may be stored in another field (not shown) in table 1408.

A player's individual collection of character play-pieces is represented by records stored in 1PlayerCharacter table 1412, a linking table that creates a many-to-many relationship between players and characters such that each player can own zero or more separate instances of the same character, and instances of that character can be owned by zero or more distinct players. Depending on the rules, a player might be permitted to use more than one copy of a particular hero figure in a game, but when an army (not shown) of orcs (such as 143) is needed, it would be fine to use duplicate copies of a figure.

If there are many copies of a play-piece in play and there is an ambiguity about which play-piece was selected with reader 120 because the identity data corresponding to the indicia are the same, the currently location of the figure (or, often, a neighboring cell location) can be read to disambiguate the identification.

In some implementations, many duplicate copies of the same figure may have slightly different indicia, for which the data will still correspond to the same character record (i.e., the CharacterID can be determined), but the data will further include a likely-to-be-disambiguating index which may be stored in the 1PlayerCharacter records in a disambiguating field (not shown). This will substantially reduce the likelihood of a disambiguation step being necessary, since while the chances of getting a duplicate figure may high, the chances of also duplicating the disambiguating index will be lower.

At any given moment, a 1PlayerCharacter record might indicate that a player's figure (e.g., 140) is not in use (by having the InstanceID field in the 1PlayerCharacter record empty), or that the figure is engaged in a scenario (by having the InstanceID field populated). In the latter case, a reference to the character's current position is stored in the MapCellID field.

Common fare to adventure games, and so represented in schema 1400 are weapons (in table 1409), armor (in table 1410) and spells (in table 1411). As with character table 1408, these records represent all possible weapons, armor, and spells currently available for the game, but not the instances of those entities. The individual instances are recorded in linking tables 1413, 1414, and 1415, the 1CharacterWeapon, 1CharacterArmor, and 1CharacterSpell tables, respectively, which effectively list everything belonging to a player's character (in table 1412). If, at step 550, the treasure that character figurine 140 found in cell 532 was a sword, then that would induce a new record to be created in 1CharacterWeapon table 1413 to note that the player's instance of character figurine 140 (the 'Mage') is now carrying a sword listed in weapons table 1409.

In some embodiments of game 100, some or all rules may be coded as records in tables such as MovementRule table 1406, which is able to track rules for movement that may differ between character races (e.g., elf, human, orc, avian, etc.) and/or classes (e.g., fighter, wizard, rogue, etc.). Such a rule tied to human wizards might be that they cannot enter a body of water without a ship, with the effect seen in step 500 of FIG. 5A, where the Mage character is prevented from entering cell 113c. In other embodiments, such rules can be coded directly into the programming of the game, rather than being data driven.

As with all such systems, the particular features of the user interfaces and the performance of the processes, will depend on the architecture used to implement a system of the present invention, the operating system of the servers and database selected, the bandwidth and other properties of the network selected, and the software code written. It is not necessary to describe the details of such programming to permit a person of ordinary skill in the art to implement the processes described herein, and provide code and user interfaces suitable for executing the scope of the present invention. The details of the software design and programming necessary to implement the principles of the present invention are readily understood from the description herein. Various additional modifications of the described embodiments of the invention specifically illustrated and described herein will be apparent to those skilled in the art, particularly in light of the teachings of this invention. Particularly as concerns games, the design choices, rules selection, as well as operating policies (e.g., for users of server 240) are creative and/or business decision, rather than being strictly technical. It is intended that the invention cover all modifications and embodiments, which fall within the spirit and scope of the invention. Thus, while preferred embodiments of the present invention have been disclosed, it will be appreciated that it is not limited thereto but may be otherwise embodied within the scope of the claims.

I claim:
1. A system for playing games, the system comprising:
a first hand-holdable play-piece, the first play-piece marked with a first indicium readable as a first data, the first data representative of at least a command;
at least one of a second hand-holdable play-piece and a third hand-holdable play-piece,
the second play-piece marked with a second indicium readable as a second data, the second data representative of at least a first play-piece identifier corresponding to the second play-piece, the second play-piece located at a first location on a map;
the third play-piece comprising the map, the third play-piece marked with a third indicium readable as a third data, the third data representative of at least a second location on the map;
a first computer programmed to determine results on the basis of at least one rule of a game,
the first computer having access to a display to show a result in the game to a player; and,
an indicia reader having communication with the first computer,
the reader to send data corresponding to detected indicia to the first computer;
wherein
the reader detects as a first selected indicium the first indicia,
the reader sends a first selected data corresponding to the first selected indicium to the first computer,
the reader detects as a second selected indicium one of the second indicium and third indicium,
the reader sends a second selected data corresponding to the second selected indicium to the first computer;

the first computer determines the result based on at least the first selected data representing the command and the second selected data representing a direct object of the command, and the first computer shows the result on the display.

2. The system of claim 1 wherein the command is to move with the location associated with the object of the command as a destination.

3. The system of claim 1 wherein the third data is further representative of a second play-piece identifier corresponding to the third play-piece and the first computer determines the result further based on the second identifier.

4. The system of claim 1 wherein at least one of the play-pieces comprises a card and the corresponding indicium is provided on the card.

5. The system of claim 1 wherein the first play-piece comprises a figure.

6. The system of claim 5 wherein the first indicium is provided on the figure.

7. The system of claim 5 wherein the first play-piece further comprises a base.

8. The system of claim 7 wherein the first indicium is provided on the base.

9. The system of claim 7 wherein the first indicium is provided on a sticker applied to the base.

10. The system of claim 1 wherein the first data is further representative of a second play-piece identifier corresponding to the first play-piece and the first computer determines the result further based on the second identifier.

11. The system of claim 1 wherein the command is to attack with the object of the command as a target.

12. The system of claim 1
wherein the first play-piece is located at a third location on the map and
the first computer determines the result further based on the third location.

13. The system of claim 12 wherein the first computer determines the result further based on a fourth location between the third location and the location corresponding to the object of the command as a target.

14. The system of claim 13 wherein the command is to move with the location corresponding to the object of the command as a destination.

15. The system of claim 13 wherein the command is to attack with the object of the command as a target.

16. The system of claim 1 further comprising:
a database,
the first computer having access to the database,
the database containing at least one parameter associated with at least one of the first and second selected data,
wherein the first computer further determines the result from the at least one parameter.

17. The system of claim 16 wherein the database is updated from a server via the Internet.

18. The system of claim 1 wherein the result is uploaded by the computer to a server through the Internet.

19. A system for use in games played with computers programmed to determine game results in response to data received from indicia readers, the system comprising:
a first movable play-piece,
the first play-piece marked by a first and second indicia,
the first indicia machine-readable as corresponding first data representative of at least one of
a) a play-piece identifier,
b) a location, and
c) a command
the second indicia machine-readable as corresponding second different data representative of at least one of
d) the same play-piece identifier,
e) a different location,
f) a different command;
wherein at least one of the first and second data is associated in a database accessible by the Internet with at least one parameter usable by a computer to determine a result of a game.

20. The system of claim 19 wherein the data corresponding to the first indicium is representative of the identity of the first play-piece.

21. The system of claim 20 wherein the identity is unique to the first play-piece with respect to a plurality of play-pieces.

22. The system of claim 21 wherein the first play-piece represents a game character.

23. The system of claim 20 wherein the first play-piece represents a game character.

24. The system of claim 20 wherein the first play-piece is a map and the data corresponding to the first indicium is further representative of a location on the map.

25. The system of claim 19 wherein the first play-piece is a map and the data corresponding to the first indicium is representative of a location on the map.

26. A system for use in games played with computers programmed to determine game results in response to provided data, the system comprising:
a first movable play-piece,
the first play-piece marked by a first indicium,
the first indicium machine-readable as first data representative of at least a command;
a second movable play-piece,
the second play-piece marked by a second indicium,
the second indicium machine-readable as second different data representative of at least a location; and,
an indicia reader manipulable by a player of a game to read the first indicium to provide, to a computer, the command represented by the first data and to read the second indicium to provide, to the computer, the location represented by the second data as a target of the command;
wherein the system is able to provide the command and the location as an object of the command on the basis of manipulation by a player of the game, allowing the computer to determine game results in response.

27. The system of claim 26 further comprising:
a machine-readable database of game-related information selectable with at least one of the first and second data.

28. A system for use in a game, the system comprising:
a first movable play-piece,
the first play-piece marked by a first indicium,
the first indicium machine-readable as corresponding first data representative of at least a command;
a second movable play-piece,
the second play-piece marked by a second indicium,
the second indicium machine-readable as corresponding second data representative of at least a play-piece identifier corresponding to the second play-piece;
a map,
the map marked by a third indicium,
the third indicium machine-readable as corresponding third data representative of at least a first location, the second play-piece located at the first location;
an indicia reader manipulable by a player of the game to read the first indicium to provide the command represented by the first data and to read the second indicium to provide the target of the command represented by the second data;

a machine-readable database of game-related information for the first location;

a computer having access to the database, the computer further having communication with the indicia reader, the computer programmed to determine a result of the game in response to the command, the target of the command, and the game-related information for at least the first location; and, a display, the computer having communication with the display, the computer further programmed to present the result on the display.

29. The system of claim 28 wherein the result is uploaded by the computer to a server through the Internet.

* * * * *